United States Patent
Rübbelke et al.

(10) Patent No.: US 10,538,024 B2
(45) Date of Patent: Jan. 21, 2020

(54) EXTRUSION TOOL WITH HEATING OF THE OUTLET REGION, METHOD FOR PRODUCING A TUBULAR PLASTICS FILM

(71) Applicant: Windmöller & Hölscher KG, Lengerich (DE)

(72) Inventors: Ingo Rübbelke, Geseke (DE); Mathias Gersmann, Osnabrück (DE)

(73) Assignee: Windmöller & Hölscher KG, Lengerich (DE)

( * ) Notice: Subject to any disclaimer, the term of this patent is extended or adjusted under 35 U.S.C. 154(b) by 497 days.

(21) Appl. No.: 14/906,615

(22) PCT Filed: May 28, 2014

(86) PCT No.: PCT/EP2014/061026
§ 371 (c)(1),
(2) Date: Jan. 21, 2016

(87) PCT Pub. No.: WO2015/010812
PCT Pub. Date: Jan. 29, 2015

(65) Prior Publication Data
US 2016/0158987 A1 Jun. 9, 2016

(30) Foreign Application Priority Data

Jul. 22, 2013 (DE) .................. 10 2013 107 808
Oct. 31, 2013 (DE) .................. 10 2013 112 028

(51) Int. Cl.
*B29C 48/09* (2019.01)
*B32B 27/08* (2006.01)
*B32B 27/32* (2006.01)

(52) U.S. Cl.
CPC .............. *B29C 48/09* (2019.02); *B32B 27/08* (2013.01); *B32B 27/32* (2013.01)

(58) Field of Classification Search
None
See application file for complete search history.

(56) References Cited

U.S. PATENT DOCUMENTS

| | | | |
|---|---|---|---|
| 3,029,474 A | 4/1962 | Voigt et al. | |
| 6,065,953 A | 5/2000 | Bentivoglio | |

FOREIGN PATENT DOCUMENTS

| | | |
|---|---|---|
| CA | 2204548 | 11/1998 |
| EP | 0149335 | 7/1985 |
| EP | 1293326 | 3/2003 |
| EP | 1995037 | 11/2008 |
| EP | 2042292 | 4/2009 |
| FR | 2148518 | 3/1973 |
| JP | 59-091037 | 5/1984 |
| WO | WO 87/06879 | 11/1987 |
| WO | WO 96/31562 | 10/1996 |
| WO | WO 2005/040232 | 5/2005 |
| WO | WO 2012/000992 | 1/2012 |
| WO | WO 2015/010812 | 1/2015 |

OTHER PUBLICATIONS

Notification of Office Action and Search Report dated Dec. 29, 2016 From the State Intellectual Property Office of the People's Republic of China Re. Application No. 201480034595.0 and Its Translation Into English. (13 Pages).
International Search Report and the Written Opinion dated Aug. 13, 2014 From the European Patent Office Re. Application No. PCT/EP2014/061026 and Its Translation of Search Report in English.
Pruefungsantrag [Request for Examination] dated Feb. 19, 2014 From the Deutsches Patent—und Markenamt [German Patent and Trademark Office] Re. Application No. 102013112028.8.
Communication Pursuant to Article 94(3) dated May 18, 2017 From the European Patent Office Re. Application No. 14726983.1 and its Translation into English.
Gander et al. "Review of Die Lip Buildup in Plastics Extrusion", XP000724850, Polymer Engineering and Science, Wiley, Hoboken, NJ, US, vol. 37, No. 7, Jul. 1, 1997: pp. 1113-1126, ISSN: 0032-3888.
International Preliminary Report on Patentability dated Oct. 30, 2015 From the International Examining Authority Re. Application No. PCT/EP2014/061026 and its Translation into English.
Request for Examination dated Feb. 19, 2014 From the German Patent and Trademark Office Re. Application No. 102013112028.8.

*Primary Examiner* — Robert T Butcher

(57) ABSTRACT

The invention relates to an extrusion tool (10) for a film blow head (1) of a tubular extrusion system for extrusion of a tube (2) from a plastic melt (3) with a tool body (11), which comprises a melting channel (12) for a configuration of a tube (2), wherein the tool body (11) comprises a collar area (13) with an outlet opening (14) for the tube (2).

11 Claims, 3 Drawing Sheets

EXTRUSION TOOL WITH HEATING OF THE OUTLET REGION, METHOD FOR PRODUCING A TUBULAR PLASTICS FILM

RELATED APPLICATIONS

This application is a National Phase of PCT Patent Application No. PCT/EP2014/061026 having International filing date of May 28, 2014, which claims the benefit of priority of German Patent Application Nos. 102013112028.8 filed on Oct. 31, 2013 and 102013107808.7 filed on Jul. 22, 2013. The contents of the above applications are all incorporated by reference as if fully set forth herein in their entirety.

FIELD AND BACKGROUND OF THE INVENTION

The invention relates to an extrusion tool for a film blow head of a tubular extrusion system for extrusion of a tube from a plastic melt with a tool body which comprises a melting channel for the configuration of the tube, wherein the tool body comprises a collar region with an outlet opening for the configured tube. Further, the invention relates to a method for the production of a plastic tube which is extruded from an extrusion tool of a film blow head. Further, the invention relates to an extruded plastic film, which is configured from a polyethylene.

From document U.S. Pat. No. 3,709,290 an extrusion tool for a film blow head of a tubular extrusion system is known. It has been shown that the surface properties of the extrudate in general show, that with low shear stress the escape of the extrudate (plastic melt) is smooth and glossy. If said tension comprises a critical value the extrudate shows a loss of surface gloss. Further, it has been shown that the extrusion of plastic films, blown films, which can be particularly configured in a multi-layered manner, with certain raw material combinations of the extrudate often structured inconsistencies at the film surface, tube surface, occur by flow dependent interactions between the flowing polymer and the melting channel wall in the collar area. These existing surface inconsistencies are also called surface melt fracture which is mainly restricted to the extrudate surface. Particularly, the often used LLDPE or mLLDPE plastics at the outer and inner layer are often not extrudable in a proper film optic without dosing additional so called process aid means (for example AMF: anti melt fracture). This process aid means serve as additives in order to for example increase the gliding properties of the plastic melt in the wall area of the melting channel, particularly to reduce the friction at the melting channel wall. These additives reduce melting fractures in the extrudates. Disadvantageously such additives are expensive and the additional costs, according to the desired concentration, avoid its use in plastics, like for example LLDPE, which for example can be intended for articles of daily use application. Further the said additives or process aid means can also influence the rheological properties of the plastic of the extruded film or tube. Further, it has been shown that in overage amounts the used additives can influence critical tube and film properties in an opposing direction like gloss, haze, transparency or weldability of the film.

SUMMARY OF THE INVENTION

The object of the present invention is to avoid said disadvantages, particularly to create an extrusion tool for a film blow head of a tubular extrusion system, a method for producing a plastic tube, wherein high ratios of defect-free extrusions of the plastic melt are achievable, particularly melt fractures in the extrudate are reduced or avoided.

The object of the present invention is solved by all features of claim 1. In the dependent claims possible embodiments according to the extrusion tools are described. Further the invention is solved by all features of the independent claim 13. In the dependent method claims possible embodiments of the method according to the invention are described. Further, the object is solved by all features of claim 16. In the dependent claims 17 and 18 possible embodiments according to the extruded plastic film according to the invention are described.

According to the invention, an extrusion tool for a film blow head of a tubular extrusion system for the extrusion of a tube from a plastic melt is intended, wherein the tool body is configured in a way that a heater intended at the tool body effects only a local heating of the collar area. It has been surprisingly shown that with a local temperature increase in the collar area the tool body, which can also be described as a nozzle, the effect of the melting fracture at the extruded plastic or at the extruded film or at the extruded plastic tube has been turned down. A main focus of the invention is hereby that a very defined, spatial limit occurs by the heating of the tool body, in fact only in or at the collar area of the tool body, at which the extrudate or the plastic melt escapes, since otherwise material burnings in the extrusion tool can occur. The tool body is hereby configured in a way that only a local heating at the collar area occurs without essentially heating the remaining tool body. Therewith a melting fracture avoiding local temperature increasing zones is formed only in or at the collar area of the tool body wherein effectively a melting fracture at the surface of the extrudate is avoided.

According to the invention, the tool body can comprise a heat separation which effects that the heat based on the heater almost reaches the collar area. Hereby it is possible that a heat separation is integrated in the tool body in a way that a heat outlet from the collar area in the remaining tool body can be kept small. For example it is possible that the heat separation is assembled at and/or in the collar area which is configured as an insulator. In a possible embodiment of the invention the heat separation can be configured as an air gap. Likewise the invention comprises that the heat separation is configured from a raw material which comprises heat insulating properties, particularly that the heat separation is configured from a ceramic material.

Further, the extrusion tool according to the invention can comprise a collar area of the tool body which extends protrusion-like from the tool body, wherein the heater is assembled in or at the collar area. Hereby it is effectively achieved that the collar area is only locally heated.

One of the measures improving the invention can intend that the heat separation comprises a thickness which is between 0.5 mm≤x≤10 mm, particularly is between 1 mm≤x≤5 mm. Particularly preferably the amount of thickness of the heat separation is between 2 mm and 3 mm. Hereby the heat separation can be configured as an air gap or can also consist of a defined raw material, which is for example ceramic. The said thickness can be sufficient in order to keep almost all the heat generated by the heater in the collar area in order to avoid a melting fracture in the extrudate.

Further, the extrusion tool according to the invention comprises that the heat separation extends in the direction of the melting channel. The extension of the heat separation can for example run mainly perpendicular to the extension of the melting channel. Likewise it can be intended that the extension of the heat separation is aligned in a defined angle, particularly inclined to the melting channel extension. Such alignment of the heat separation can influence the effectiveness of the local heating of the collar area.

Advantageously, a distance between the heat separation and the melting channel remains, which is particularly 0.5 mm≤y≤10 mm. Particularly preferred the distance between the heat separation and the melting channel comprises a value which is approximately between 1 mm and 5 mm. Hereby, the tool body is not significantly weakened. Further, a reliable heat separation occurs which effectively avoids or reduces a heat outlet from the collar area into the remaining tool body.

In an embodiment, the extrusion tool comprises an extrusion body with a heater and a heat separation which is configured in a way that the melting temperature of the melting channel in the collar area is higher than the melting temperature of the plastic melt. Advantageously, the melting temperature of the melting channel, in case the heater is operated, is 105% to 150% $T_o$, wherein $T_o$ is the melting temperature of the plastic melt. Advantageously, it has turned out that with such temperatures with the melting channel wall a thin lubricating film is achieved at the plastic melt, wherein an adhesion of the plastic melt with the melting channel wall is reduced or avoided. Hereby, a melting fracture at the surface of the extrudate can be effectively avoided.

In a measure improving the invention the collar area can extend circumferentially at the tool body, wherein the collar area comprises an inner collar area and an outer collar area, wherein the inner collar area and/or the outer collar area comprise the heater. The collar area can be configured as a ring which extends circumferentially at the tool body so that a tube can be generated as an extrudate from the extrusion tool.

It is particularly advantageous that the tool body is configured in a way that the collar area can be retrofitted with the heater at the tool body. Therewith it can be meaningful to facilitate an easy assembly of the collar area at the remaining body of the tool body by fixing it separately as a spare part, wherein the manner of assembly can be form- and/or force-fitting and/or in a material bonding manner.

Further, the invention is described by a method for producing a plastic tube which is extruded from an extrusion tool of a film blow head, wherein the extrusion tool comprises a tool body with a melting channel from which the plastic tube is formed from a plastic melt, the tool body comprises a collar area with an outlet opening for the configured plastic tube and a heater is intended at the tool body, which effects only a local heating of the collar area, wherein a thin lubricant film of the plastic melt in the melting channel results, wherein the lubricant film extends along the tool body of the collar area so that a melting fracture at the plastic tube is avoided. It is particularly advantageous that a thin lubricant film is established at the border area of the plastic melt which is facing the melting channel. At the border area of the plastic melt a thin lubricant film results which is advantageously of low viscosity and comprises a small adhesion effect with the melting channel wall. Hereby, an extrudate surface results which comprises hardly any or no surface irregularities, which normally can lead to a surface melting fracture.

According to the invention it can be intended that the heater inserts heating energy in the collar area so that a lubricant film of low viscosity results, particularly that the tool body comprises a heat separation which effects that the heat resulting from the heater reaches almost the collar area and/or that a heat separation is integrated at the tool body in a way that a heat outlet from the collar area into the remaining tool body can be kept small. Hereby, it is an advantage that the viscosity of the lubricant film is essentially smaller than the viscosity of the remaining plastic melt within the collar area.

The method according to the invention and the extrusion tool according to the invention can be particularly effectively applied during the production of a plastic tube which is an extruded plastic film which is configured from polyethylene, particularly a LLDPE-film or mLLDPE-film. Particularly linear polyethylene plastics (LLDPE) have a tendency to a surface melt fracture due to their mechanic properties and streaming instabilities as an extrudate. The intended extrusion tool and the said method according to the invention can effectively avoid the melting fracture with said plastics.

Further, the invention relates to an extruded plastic film which is configured from polyethylene, particularly a LLDPE-film or mLLDPE-film, wherein the film is at least configured from a layer, the layer is configured from 100 parts per weight, wherein the layer comprises a melting fracture avoiding process aid means with a part per weight of 0 to 2. Advantageously, the extruded plastic film comprises 0 parts per weight of a process aid means, which can avoid a melting fracture. Hereby, the production costs of a plastic film can be reduced. Further, no process aid means (additives) are necessary which can also influence the critical film properties negatively in an opposing direction. In certain applications it can even be forbidden to use process aid means, particularly in a defined concentration.

Advantageously, a co-extruded plastic film can be intended according to the invention which is configured from multiple layers, wherein at least one of both outer layers can be configured as follows:

The outer layer is configured from 100 parts per weight, wherein the outer layer comprises a process aid means avoiding melting fracture with a 0 to 2 parts per weight.

The said extruded plastic film or plastic film variants can be generated with the method described in this invention or with the help of an extrusion device according to this invention.

BRIEF DESCRIPTION OF THE SEVERAL VIEWS OF THE DRAWINGS

Further advantages, features and details of the invention result from the subsequent description in which multiple embodiments of the invention are described in detail in relation to the drawings. Thereby, the details described in the claims and the description can be essential for the invention each single for themselves or in any combination. It is shown:

DESCRIPTION OF SPECIFIC EMBODIMENTS OF THE INVENTION

Figure 1:
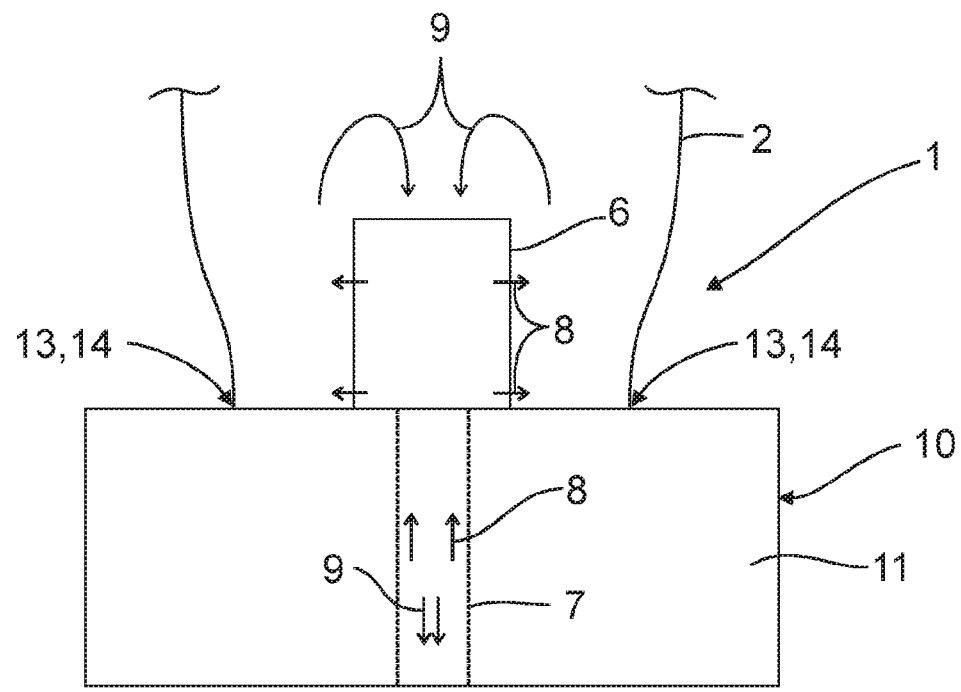
FIG. 1 a schematic view of a blow film of a tubular extrusion system.

In FIG. 1 a film blow head 1 is schematically shown, which can be used in a tubular extrusion system for extrusion or co-extrusion of a plastic tube 2 or a plastic film 2 from a thermoplastic plastic melt 3. Hereby, the film blow head 1 comprises an extrusion tool 10 with a tool body 11, which comprises a melting channel 12 (see FIG. 2) for the generation of the plastic tube 2. This melting channel 12 is configured annularly and comprises an outlet opening 14 according to FIG. 2 at the upper side of the tool body 11 from which the heated plastic melt 3 and/or the configured tube 2 (also known as extrudate) escapes.

Via a cooling unit 6 an inner tube cooling can be realised, by which cooling air 8 flows in the direction of the inner side of the tube via not explicitly shown outlet channels of the cooling unit 6. In the present embodiment the cooling unit 6 is configured as a layer cooling, by which a plurality of outlet channels are intended for the cooling air 8, which are assembled one on top of the other in order to cool the tube 2 in different heights spaced apart from the inner side of the tube. Further, an air guide 7 is intended which extends through the tool body 11, which sucks the heated exhaust air 9, which results from the cooling of the inner side of the tube. Further, said cooling air 8 flows through the air guide 7 in the cooling unit 6.

Figure 2:
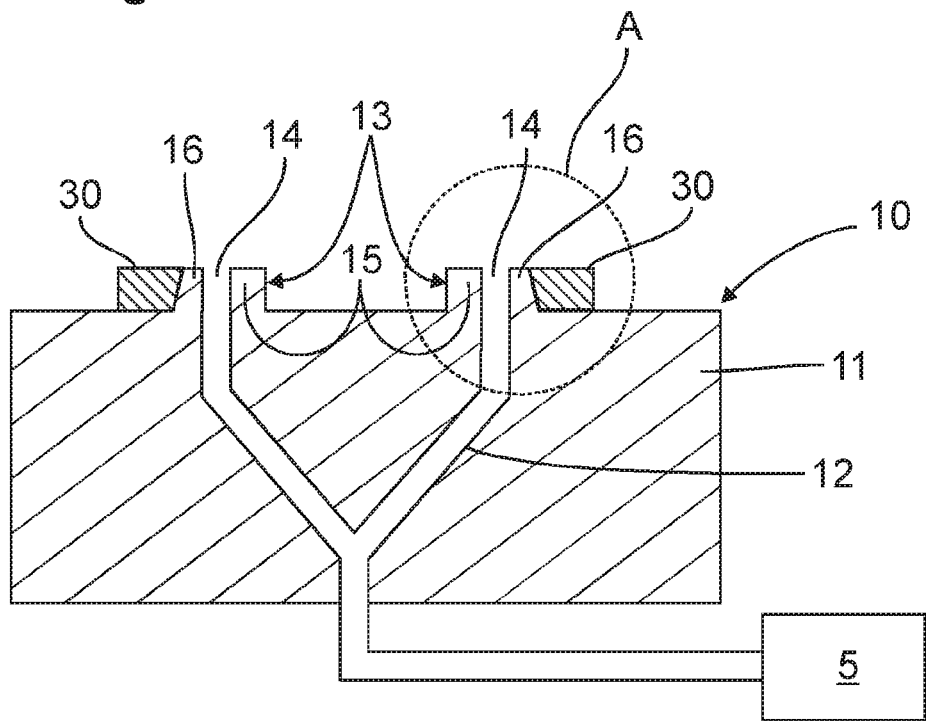
FIG. 2 a schematic view of an extrusion tool for a film blow head of a tubular extrusion system, FIG. 3 a possible embodiment of the collar area of the extrusion tool according to FIG. 1 or FIG. 2, FIG. 4 a sectional view of a generated, extruded plastic tube according to FIG. 1, FIG. 5 a further embodiment of the collar area of the extrusion tool according to FIG. 1 or FIG. 2, FIG. 6 a further embodiment of the collar area of the extrusion tool according to FIG. 1 or FIG. 2 and FIG. 7 a further embodiment of the collar area of the extrusion tool according to FIG. 1 or FIG. 2.

In FIG. 2 further an extruder 5 is shown schematically. The plastic melt 3 flows through a guidance into the tool body 11, wherein the plastic melt 3 can be heated to a defined temperature in order that the plastic melt 3 or the plastic tube 2 can escape from the collar area 13 of the tool body 11, like schematically shown in FIG. 1. The collar area 13 comprises an outlet opening 14, which is configured annularly at the upper side of the tool body 11.

In order to avoid a melt fracture of the surface of the escaping film 2 or tube 2, the tool body 11 comprises a heater 30 at the collar area 13, which effects only a local heating of the collar area 13. According to FIG. 3 and FIG. 5 the local heating of the collar area 13 effects that a thin lubricant film 4 of the plastic melt 3 results in the melting channel 12. Hereby, a melting fracture at the surface of the extrudate 2 can be avoided. The lubricant film 4 is of low viscosity according to the invention, wherein the lubricant film results at the wall 17 of the melting channel 12.

Further, the shown embodiments comprise an intended heat separation 31 at the tool body 11, which effects that the heat Q resulting from the heater 30 almost reaches the collar area 13. Hereby, the heat separation 31 is integrated in the tool body 11 in a way that a heat outlet from the collar area 13 into the remaining tool body 11 remains small. The invention according to all embodiments only allows that the heat flow occurs in the direction of the melting channel 12 of the collar area 13.

According to all embodiments the collar area 13 extends protrusion-like from the tool body 11, wherein the heater 30, which is for example an electric heater 30, is assembled directly at the collar area 13 in order to effectively drain-off the heat in the collar area 13.

Figure 3:
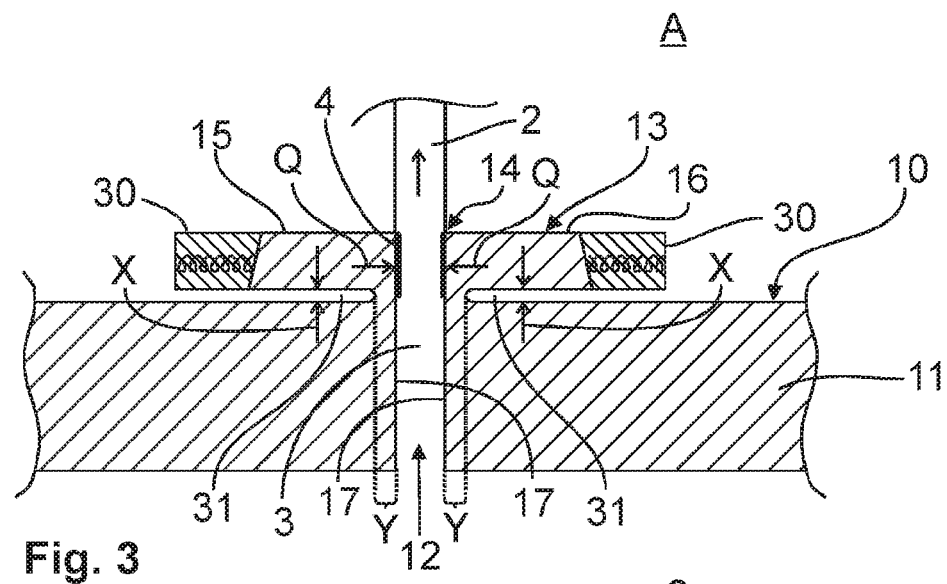

In FIG. 3 it is shown that the heat separation 31 can be configured as an air gap. According to FIG. 5 it is shown that the heat separation 31 can be configured from a raw material, which comprises heat insulating properties. In the present embodiment the heat separation 31 according to FIG. 5 is configured from a ceramic material.

According to all embodiments the collar area 13 extends circumferentially at the tool body 11, wherein the collar area 13 comprises an inner collar area 15 and an outer collar area 16. This special collar area 13, 15, 16 according to the invention can also be called die lip. According to all embodiments it is possible that the inner and outer collar area 15, 16 comprise a separate heater 30 in order to generate the already described lubricant film low of viscosity at the wall 17 within the plastic melt 3. The melting fracture at the extrudate surface can be avoided or reduced when one of both collar areas 15, 16, meaning the inner collar area 15 or the outer collar area 16, are equipped with a heater 30.

Figure 5:
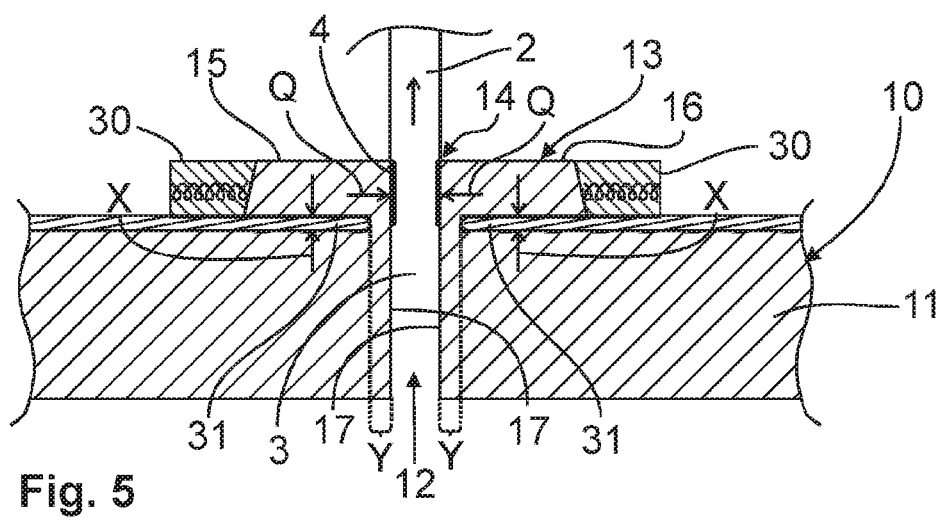
Figure 6:
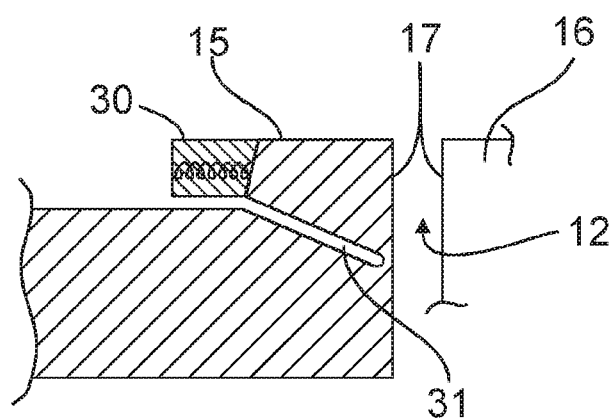
Figure 7:
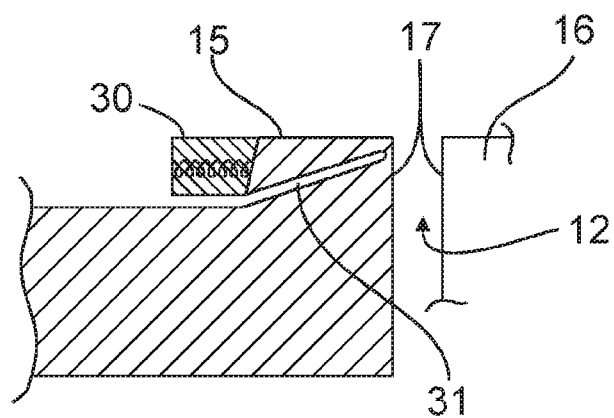

According to FIG. 3 and FIG. 5 the heat separation 31 extends perpendicularly to the extension of the melting channel 12. According to the requirement profile and the technical basic conditions it can be meaningful that the heat separation 31 comprises an inclined course for the extension of the melting channel 12, which is exemplarily shown in FIG. 6 and FIG. 7. According to FIG. 6 and FIG. 7 the already described lubricant film 4 results mainly above the heat separation 31 at the wall 17, which avoids a melting fracture at the surface of the extrudate 2. The embodiment according to FIG. 6 and FIG. 7 can be combined with an embodiment according to FIG. 5, which means that according to FIG. 6 and FIG. 7 instead of the air gap as a heat separation 31 a heat insulating raw material can be used as a heat separation 31, particularly from a ceramic material.

Particularly it is an advantage that the heat separation 31 comprises a thickness x which is between $1\ mm \leq x \leq 5\ mm$, particularly comprises a thickness of approximately 3 mm. Further, it has turned out as an advantage that a distance between a heat separation 31 and the melting channel 12 remains, which is between $3\ mm \leq y \leq 5\ mm$. Said description according to the thickness of the heat separation 31 and the distance y is likewise applicable according to FIG. 5 to FIG. 7.

Figure 4:
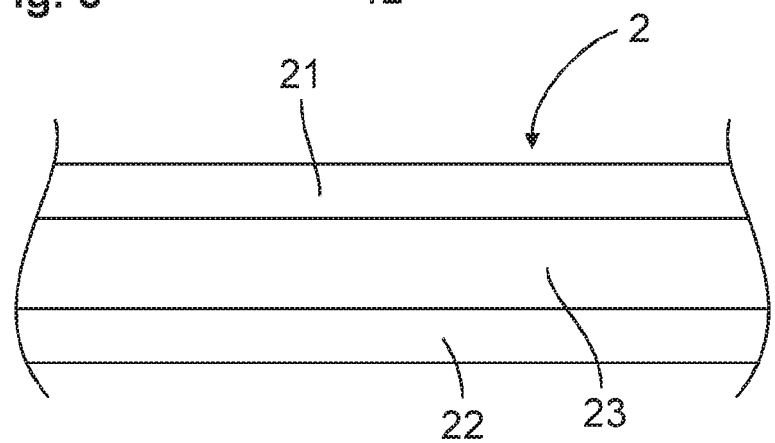

According to all embodiments an extrudate or a film 2 or a tube 2 can be produced, wherein at the surface the irregularities, particularly surface melting fractures, can be effectively avoided. Therewith, surface defects can be effectively avoided. Particularly an extrudate plastic film 2 can be produced which is produced from polyethylene, wherein the film 2 can be configured from only one layer or from a plurality of layers 21, 22, 23. In FIG. 4 a plastic film 2 is shown, which is configured from a carrier layer 23 and two outer layers 21, 22. Likewise it is possible that between the two outer layers 21, 22 further intermediate layers are intended. Particularly it is an advantage that according to the invention a melting fracture avoiding process aid means can be avoided or the percentage per weight can be extremely reduced. This applies particularly with LLDPE-films or mLLDPE-films, which can be generated according to all embodiments from FIG. 1 to FIG. 7.

LIST OF REFERENCE CHARACTERS

1 Film blow head
2 Extrudate, tube, film
3 Plastic melt
4 Lubricant film
5 Extruder
6 Cooling unit, level cooling
7 Air guide
8 Cooling air
9 Exhaust air 10 Extrusion tool
11 Tool body
12 Melting channel
13 Collar area
14 Outlet opening
15 Inner collar area
16 Outer collar area
17 Wall
21 Outer layer
22 Outer layer
23 Carrier layer
30 Heater
31 Heat separation

What is claimed is:

1. An extrusion tool for a film blow head of a tubular extrusion system for extrusion of a tube, which comprises:
    a tool body having a melting channel for a configuration of a tube extruded from a plastic melt,
    a collar area with an outlet opening for the tube,
    a heater for a local heating of the collar area, and
    a heat separation,
    wherein a distance Y between the heat separation and the melting channel remains between 0.5 millimeter (mm) and 10 mm;
    wherein the heat separation extends from an opening to an ending in the collar area around the outlet opening toward the melting channel, wherein the distance y is configured as a distance between the ending of the heat separation and an outer boundary of the melting channel.

2. The Extrusion tool according to claim 1, wherein the heat separation extends in the direction of the melting channel, wherein the extension of the heat separation proceeds mainly perpendicular to the extension of the melting channel and the extension of the heat separation is aligned in a defined angle, wherein the effectiveness of the local heating of the collar area is influenced.

3. The Extrusion tool according to claim 1, wherein the heat separation is integrated in the tool body such that heat flow occurs only in a direction of the melting channel of the collar area.

4. The Extrusion tool according to claim 1, wherein the heat separation is integrated in the tool body such that a heat outlet from the collar area into a remaining part of the tool body is kept low.

5. The Extrusion tool according to claim 1, wherein the collar area extends protrusion-like from the tool body, wherein the heater is assembled in or at the collar area.

6. The Extrusion tool according to claim 1, wherein the heat separation is assembled at least at or in the collar area, which is configured as an insulator.

7. The Extrusion tool according to claim 1, wherein the heat separation is configured as an air gap or that the heat separation is configured from a raw material having heat insulating properties.

8. The Extrusion tool according to claim 1, wherein the heat separation extends in a direction of the melting channel.

9. The Extrusion tool according to claim 1, wherein the tool body with a heater and the heat separation are configured in a way that in the collar area a wall temperature of the melting channel is higher than a melting temperature of the plastic melt.

10. The Extrusion tool according to claim 1, wherein the collar area extends circumferentially at the tool body, wherein the collar area comprises an inner collar area and an outer collar area, wherein at least the inner collar area or the outer collar area comprise the heater.

11. The Extrusion tool according to claim 1, wherein an extension of the heat separation is aligned in a defined angle inclined to the melting channel.

* * * * *